US010416793B2

(12) United States Patent
Dreyer et al.

(10) Patent No.: US 10,416,793 B2
(45) Date of Patent: Sep. 17, 2019

(54) SELECTION UNIT TO SELECT OR CONTROL DIFFERENT STATES OR FUNCTIONS OF AN AIRCRAFT SYSTEM

(71) Applicant: Airbus Defence and Space GmbH, Ottobrunn (DE)

(72) Inventors: Daniel Dreyer, Hohenkammer (DE); Matthias Oberhauser, München (DE)

(73) Assignee: Airbus Defence and Space GmbH, Ottobrunn (DE)

( * ) Notice: Subject to any disclaimer, the term of this patent is extended or adjusted under 35 U.S.C. 154(b) by 769 days.

(21) Appl. No.: 14/934,788

(22) Filed: Nov. 6, 2015

(65) Prior Publication Data

US 2016/0132134 A1 May 12, 2016

(30) Foreign Application Priority Data

Nov. 6, 2014 (EP) ..................................... 14192095

(51) Int. Cl.
| | |
|---|---|
| *B64C 19/00* | (2006.01) |
| *G06F 3/0362* | (2013.01) |
| *G06F 3/0488* | (2013.01) |
| *B64D 45/00* | (2006.01) |

(52) U.S. Cl.
CPC ............ *G06F 3/0362* (2013.01); *B64C 19/00* (2013.01); *B64D 45/00* (2013.01); *G06F 3/0488* (2013.01)

(58) Field of Classification Search
CPC ..... G06F 3/0362; G06F 3/0488; B64C 19/00; B64D 45/00
USPC ........................................................ 340/945
See application file for complete search history.

(56) References Cited

U.S. PATENT DOCUMENTS

| | | | | |
|---|---|---|---|---|
| 8,264,378 | B1 * | 9/2012 | Martins ................. | G01C 23/00 340/684 |
| 2004/0015274 | A1 * | 1/2004 | Wilkins, Jr. ......... | G01C 23/005 701/3 |
| 2005/0174429 | A1 * | 8/2005 | Yanai ....................... | B60R 1/00 348/148 |
| 2007/0085705 | A1 * | 4/2007 | He ......................... | G01C 23/00 340/967 |
| 2007/0159452 | A1 * | 7/2007 | Basche ................. | G06F 3/0362 345/156 |

(Continued)

OTHER PUBLICATIONS

European Search Report issued in counterpart European Patent Application No. 14192095.9, pp. 1-6, dated May 6, 2015.

(Continued)

*Primary Examiner* — Jack K Wang
(74) *Attorney, Agent, or Firm* — Hoffmann & Baron, LLP

(57) ABSTRACT

Provided is a selection unit for selecting different states or functions of an aircraft system, including: a manually operable selection element, the selection element including a first display indicating the actual selection state of the selection element, with each selection state of the selection element representing a different state or function of the aircraft system, wherein the selection element is additionally designed and configured for a dynamic electronic selection of the actual selection state based on an external signal input, and a second display co-located with the selection element, the second display visualizing the actual state of the aircraft system depending on the actual selection state of the selection element.

17 Claims, 4 Drawing Sheets

(56) References Cited

U.S. PATENT DOCUMENTS

| | | | |
|---|---|---|---|
| 2007/0179684 A1* | 8/2007 | He | G01C 23/00 |
| | | | 701/3 |
| 2008/0198157 A1* | 8/2008 | Feyereisen | G01C 23/005 |
| | | | 345/419 |
| 2009/0045982 A1* | 2/2009 | Caillaud | G01C 21/00 |
| | | | 340/972 |
| 2010/0141610 A1* | 6/2010 | Yoneji | B60H 1/00985 |
| | | | 345/184 |
| 2012/0267221 A1* | 10/2012 | Gohng | G06F 3/016 |
| | | | 200/61.54 |
| 2013/0050124 A1 | 2/2013 | Helot | |
| 2016/0124509 A1* | 5/2016 | Garvis | G06F 3/016 |
| | | | 345/173 |

OTHER PUBLICATIONS

Office Action issued in European Patent Application No. 14 192 095.9-1216 dated Oct. 23, 2018.

\* cited by examiner

SELECTION UNIT TO SELECT OR CONTROL DIFFERENT STATES OR FUNCTIONS OF AN AIRCRAFT SYSTEM

CROSS REFERENCE TO RELATED APPLICATION

This application claims priority to European Patent Application No. EP 14 192 095.9, filed on Nov. 6, 2014, which is incorporated herein by reference in its entirety.

BACKGROUND

Field of Technology

The invention relates to a selection unit. The selection unit is designed and configured to select or control different states or functions of an aircraft system. The term "aircraft system" has to be broadly understood and may refer to any selectable and/or controllable system located in an aircraft, for example an aircraft fuel system, an aircraft engine system, an aircraft pressurizing system (bleed-air/cabin air).

Brief Discussion of Related Art

Selection units used in today's cockpit overhead panels for selecting or controlling different states of aircraft systems or functions typically include one or more selector elements, for example: toggle switches and/or rotary switches and/or push button switches. For a selection of different selection states of the respective aircraft system these switches need a manual input, for example moving, turning or pushing the relevant switch, to change from one switch position to another switch position. Each switch position represents one (control) state of the respective aircraft system/function.

Future aircraft operational concepts are moving from a system-based control to a function-based control of aircraft systems. Based on this development, future aircraft cockpits will feature more automation with the need for automatic and dynamic access to all kind of cockpit controls.

SUMMARY

Accordingly, it is the object of the invention to provide a selection unit for an aircraft system, enabling a higher degree of automation and providing a higher flexibility. It is another object of the invention to provide a selection unit for dynamic selection of different states of an aircraft system while maintaining the haptic feedback of the selection unit indicating the actual selection status of the selection unit for the flight crew, even in non-visible (smoke) conditions.

A first aspect of the invention provides a selection unit for selecting or controlling different states or functions of an aircraft system, including a manually operable selection element, the selection element including a first display indicating the actual selection state of the selection element with each selection state of the selection element representing a different state of the aircraft system, wherein the selection element is additionally designed and configured for a dynamic electronic selection of the actual selection state based on an external signal input, and a second display co-located with the selection element, the second display visualizing the actual state of the aircraft system depending on the actual selection state of the selection element.

The terms "first display" and "second display" have to be broadly understood. Each of them represents a display with one or more dynamically controllable light emitting elements, for example, a light emitting display, which indicates the actual selection state of the selection element (first display), or the actual state of the aircraft system (second display). Each display may include, e.g., one or more LEDs, and/or one or more light conducting and light emitting elements, and/or one or more graphical displays, for example LED, LCD, Plasma, OLED, and/or Retina displays. The second display may include a painted non-changeable schematic of the aircraft system with dynamically controllable light emitting elements. The second display may be a touch screen display providing input options, which may be used to specify the displayed content of the second display or for any other input. The first display and second display may include respective electrical controlling units for controlling and powering the light emitting elements.

In a preferred embodiment of the proposed selection unit, the first display is designed and configured with at least one light emitting source showing a simple line element or an arrow. In this case, the different states of the selection element are indicated by dedicated orientations of the line element or the arrow.

The first display itself may have a fixed orientation relative to the selection unit, so that the actual selection state of the selection element is indicated by the actual orientation of the line element or the arrow.

Alternatively, the first display itself may have a fixed orientation relative to a movable part of the selection element, so that the actual selection state of the selection element is indicated depending on the actual orientation of the moving part of the selection element.

In a preferred embodiment of the proposed selection unit, the second display is designed and configured to show a schematic representing the aircraft system, wherein the actual state of the aircraft system or its active parts are optically highlighted and/or indicated in a different colour, compared to non-active parts of the aircraft system.

The proposed selection unit enables a manual and an automatic (=dynamic) setting of the selection status of the selection element, and thus a setting or controlling of the actual state/function of the aircraft system. The automatic setting may be based on software produced electronic signals, i.e. automatically triggered signals from another system, i.e., the ECAM system, of the aircraft.

The proposed selection unit enables an operator or the flight crew respectively to optically get a clear picture from the first display and second display about the actual selection state of the selection element and the actual state of the aircraft system. Further, the proposed selection unit enables a haptic feedback to the flight crew/operator about the actual selection state of the selection element.

In a preferred embodiment, the proposed selection unit includes an actuator for physically moving the selection element into a position corresponding with the actual selection state of the selection element. The actuator may be for example an electrical motor, an electromagnetic actuator, a piezo-electrical actuator. This is especially beneficial to avoid any confusion following an automatic selection of the actual state of the aircraft system, because of a mismatch of the actual physical state of the aircraft system and the actual status of the selection element.

In a preferred embodiment, the selection element is designed and configured as a rotary switch, as a push button switch, as a toggle switch, or as a rocker switch. Especially if the selection element is designed as a rotary switch, the rotary switch may be additionally designed and configured for providing a push button function, wherein an actual selection state of the selection element may be manually changed only by a combination of manually turning a rotatable part of the rotary switch and manually pushing the rotary switch. This ensures a safety function against unintentional manual activation of the selection element. This function may be useful to select an abnormal or emergency state of the aircraft system.

In a preferred embodiment of the proposed selection unit, the selection element is designed as a rotary switch including a rotatable outer element surrounding an inner non-rotatable part, which includes the first display. The outer element may be a rotatable ring co-axially aligned with the non-rotatable part. The selection element may be designed and configured allowing an endless rotation of the outer element without any stop.

In a preferred embodiment of the proposed selection unit, the selection element is designed and configured as a rotary switch with a rotatable part, wherein the selection element includes at least one dynamically allocatable hard stop position for the rotatable part based on an external signal input preventing a further rotation of a rotatable part beyond the hard stop position.

In another preferred embodiment of the proposed selection unit, the selection element is designed and configured as a rotary switch with at least one dynamically allocatable mechanical threshold switch position and/or threshold force based on an external signal input, allowing a further rotation of the rotary switch (i.e., the rotatable part of the switch) beyond the mechanical threshold position, only when applying a force for overcoming the mechanical threshold.

In another preferred embodiment of the proposed selection unit, the selection element is designed and configured as a rotary switch with a dynamically allocatable force or torque distribution based on an external signal input. The force/torque distribution defines a force $|f(\alpha)|$ or a torque $|d(\alpha)|$ along a rotation angle $\alpha$ of the moving part of the switch, which has to be overcome to turn the rotatable part of the switch. The angle $\alpha$ may vary from 0° to 360°. In general, this embodiment covers the preceding one, because there is one force distribution, which corresponds to a definition of a threshold switch position with a respective force.

All three preceding embodiments allow a dynamic allocation of mechanical characteristics of the selection element, i.e., in the first preceding embodiment, a dynamic allocation of hard stop positions, in the second preceding embodiment, a dynamic allocation of at least one mechanical threshold position and force/torque to overcome the threshold, and in the third preceding embodiment, a dynamic allocation of a force distribution $|f(\varphi)|$ or a torque distribution $|d(\varphi)|$, each based on external signal input. This external signal input may be generated automatically/software based depending on the aircraft system or depending on the actual status of the aircraft system. This provides a great flexibility in using the selection element for different tasks and different aircraft systems.

In a preferred embodiment of the proposed selection unit, the selection element includes an electromagnetic brake, an electric motor or another suitable means for physically realizing the mechanical threshold or the force/torque distribution. The electromagnetic brake may include control electronics to control the brake according to the external signal input. The mechanical brake or hard stop function of the selection element may also be configured or used as dynamically allocatable safety locks, which allow a switching of the selection element only under prespecified conditions.

The external signal input for the dynamic electronic selection of the actual selection state preferably depends on an aircraft system selectable from a number of aircraft systems and/or an actual system status of the aircraft system. A selection of the actual aircraft system from the several aircraft systems may be dynamically and automatically allocated by software or another aircraft system (i.e., ECAM system) and/or manually allocated by operation of an input device. In the last case, the selection unit includes an input device for manually selecting the aircraft system from the number of aircraft systems. The input device may be a toggle switch, a rotary switch, etcetera. These brakes/hard stops can also be used as safety locks, i.e., only switchable if system allows the activation.

A second aspect of the invention provides an aircraft system with a selection unit according to the preceding specification.

A third aspect of the invention provides an aircraft with a selection unit according to the preceding specification.

DETAILED DESCRIPTION

Figure 1:
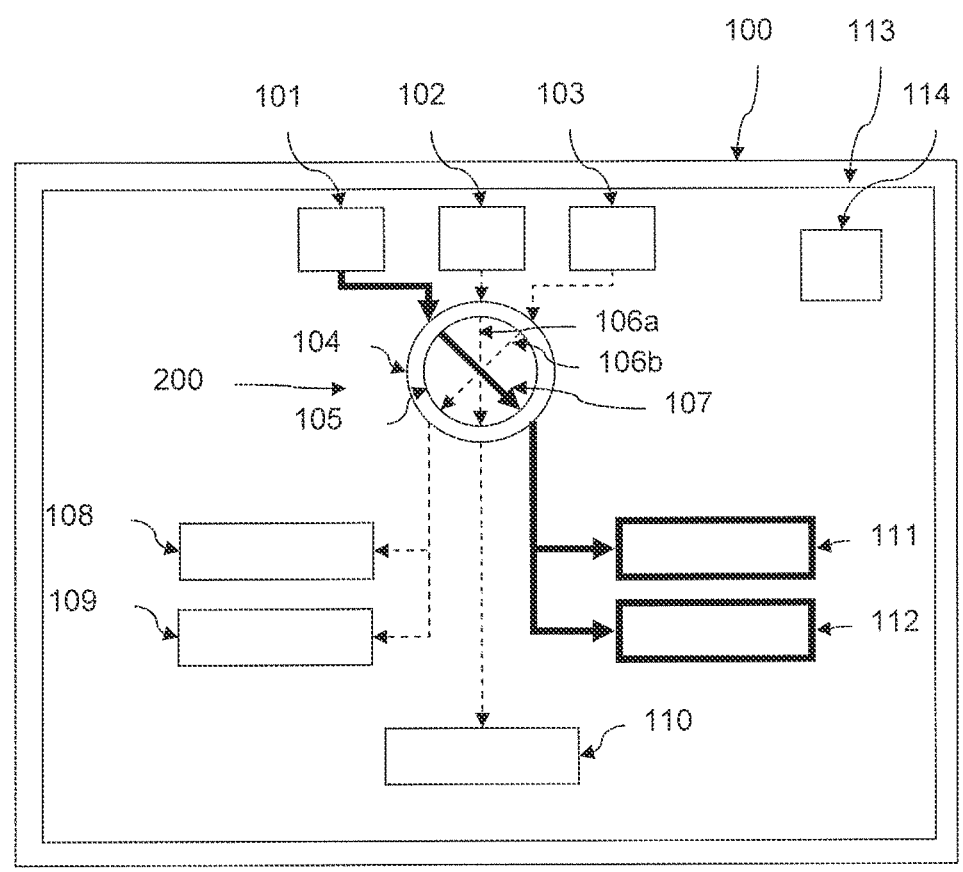
FIG. 1 is a schematic top view of a proposed selection unit.

FIG. 1 shows a schematic top view of a proposed selection unit 100 as can be seen by a flight crewmember. The selection unit 100 is installed in an overhead panel in the cockpit. The selection unit 100 allows selection of three different states 101, 102, 103 of an aircraft system. The aircraft system in this example is a hydraulic system. State 101 represents "Normal Operation 1", state 102 "Emergency Operation" and state 103 "Normal Operation 2".

The selection unit 100 includes a manually operable selection element 200. The selection element 200 is designed as a rotary switch with an outer ring 104 as a rotatable part and a non-rotatable part 105 of the switch. The selection element 200 includes a first display 105, which equals the non-rotatable part of the rotary switch indicating the actual selection, state 107 of the selection element 200. Each possible selection state 106a, 106b, 107 of the selection element 200 represents one of the above-described states: 101, 102, 103 of the hydraulic pressure system and is indicated in FIG. 1 as arrow pointing in different directions. In reality, all dotted lines, i.e., all non active/actually selected links of FIG. 1, are not displayed on the first display and second display to avoid confusion. For a selection of a state of the aircraft system, the rotatable part 104 must be manually rotated in the respective direction (left/right). A selection of the state 102—"Emergency Operation"—requires a respective rotation of the rotatable part 104 and two pushes on the non-rotatable part 105 within 2 seconds. This safety feature should avoid unintended activation of the "Emergency Operation".

The selection element 200 is additionally designed and configured for a dynamic electronic selection of its actual state on an external signal input. The input signal may be automatically generated by an ECAM (=Electronic Centralized Aircraft Monitor) system of the aircraft.

Further, the selection unit 100 includes a second display 113, which in this example is a graphical color display. The selection element 200 and another input device 114 are arranged within the second display 113, i.e., the graphical color display is arranged around the selection element 200 and the device 114. The second display 113 visualizes a schematic of the aircraft system that highlights the actual state 101 ("Normal Operation 1") of the aircraft system depending on the actual selection state 107 of the selection element 200. Following a dynamic change of the actual state of the selection element 200 (representing a dynamic change of the actual state of the aircraft system), the content of the second display is changed accordingly, showing now the new actual state of the aircraft system.

The schematic of the aircraft system in this example includes different subsystems 108-112, which could be supplied by hydraulic power depending on the selection state of the selection element 200. The actual state 107 ("Normal Operation 1") of the hydraulic system is represented on the second display 113 by highlighting the subsystems 111 and 112 and the respective link lines/arrows in bold. Thus, in the actual system state 101 corresponding with the actual state 107 of the selector element 200 the subsystems 111 and 112 are supplied by hydraulic power.

All elements, 102-103, and 108-112, including their active links, are shown on the second display 113. All dotted links are only shown in FIG. 1 for information, i.e., all elements shown in the display 113 except the manual input devices, rotary switch 200 and another manual selector 114, for selecting the aircraft system from several aircraft systems, are dynamically generated by respective driving software of the second display 113. This provides a great flexibility because the proposed selection unit 100 is usable for different aircraft systems. Further, only one selection unit 200 is needed for controlling different aircraft systems or functions. With manual selector 114 (may be a toggle switch, or push button switch, or rotary switch), an actual aircraft system can be selected from the number of aircraft systems. With each selection of an aircraft system with the manual selector 114, the relevant system schematic is shown on the second display 113, including the actual state of the respective system. Further, following the selection of the aircraft system, the respective selection states of the selector element 200 are indicated on the second display 113, and the selector element 200 shows its actual selection state corresponding to the actual selection state of the selected aircraft system. The proposed selection unit 100 provides a great variety and flexibility in manual and dynamic control of one or more aircraft systems.

The selection unit 100 may combine the benefits of a haptic switch with the flexibility of a touch screen as second display 113. The touch screen may allow for a selection between differently detailed system schematics.

Some possible use-cases are:
changing the number of selectable items;
highlighting inactive or unavailable items;
highlighting the next or recommended action; and
rearranging the selectable items,
according to an actual flight phase or an actual crew workload.

In case of a dynamic electronic selection of the actual selection state 107 based on an external signal input, for example from the ECAM system, the indicated actual selection state 107 of the selection element 200 is automatically changed accordingly.

In general, if a system state activated/changed automatically or via the ECAM system, the selection element 200 should turn to a new position automatically. Otherwise, the selection unit 100 and the ECAM would display two different system states. If the implementation of such an active moving switch is difficult, only the indication could be changed as realized in current example of FIG. 1.

Figure 2:
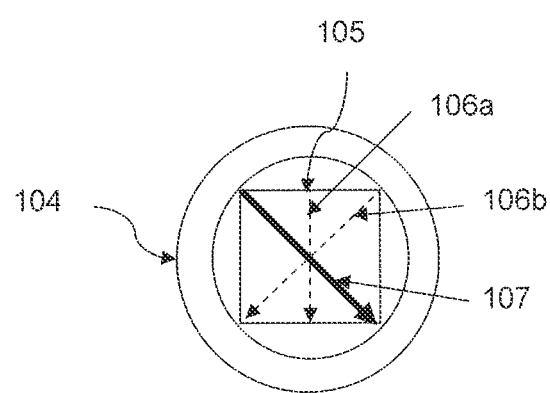
FIG. 2 is a schematic top view of a proposed selection element.

FIG. 2 shows a schematic top view of a proposed selection element 200. The selection element 200 is designed and configured as a rotary switch, including a manually rotatable part 104 formed as a ring, and a non-rotatable part in the middle of the rotatable part (ring) 104. The non-rotatable part includes the first display 105 indicating the actual selection state 107 of the selection element 200 (rotary switch). The other possible selection states are indicated for information only by dotted lines. Only the actual status 107 of selection element is illuminated/shown in the selection element 200 (rotary switch) in reality.

In the rotary switch of FIG. 1 and FIG. 2, there is no hard stop for the rotating part 104 of the rotary switch. If hard stops should be included, they have to be dynamic.

Figure 3:
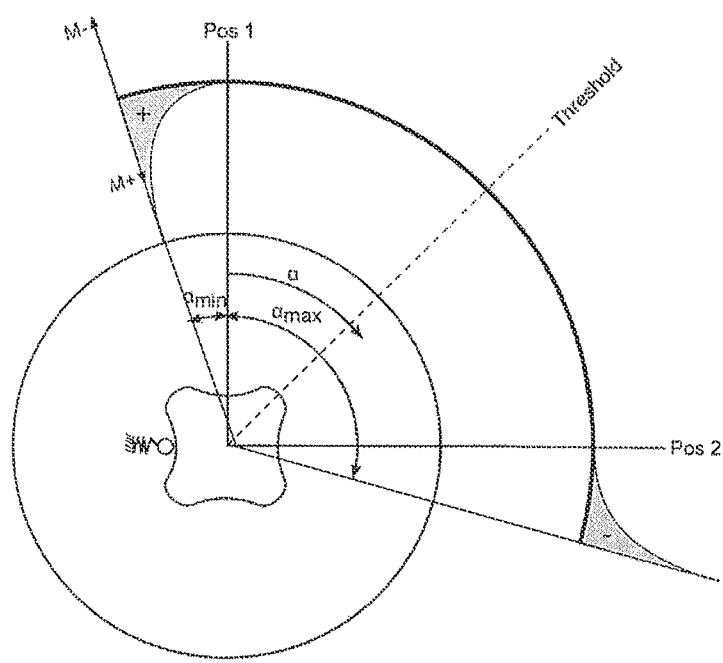
FIG. 3 is a graph showing dynamic hard stops of the selection element.

A first concept mixes an electromagnetic brake with mechanical thresholds as used in today's rotary switches. A mechanically fixed distance between the thresholds is assumed. In FIG. 3, a ball that is pressed against geometry that recreates the thresholds, each 'valley' represents a selectable item and each 'hill' the threshold that has to be overcome in order to turn the switch, simplifies this mechanical locking. A sensor monitors the current position of the switch ($\alpha$). If the current position a reaches limits $\alpha_{max}$ or $\alpha_{min'}$ an electromagnetic brake, which acts against direction of rotation, is activated. This brake must be strong enough to inhibit any further movement. The limits $\alpha_{max}$ and $\alpha_{min'}$ can be set dynamically.

As an example, a pilot sets the rotary switch to 'Pos 1'. Thus, the switch is at its left limit. If the system (e.g., ECAM) switches via software to 'Pos 2', the indication on the switch (first display) would change accordingly, but the left limit would persist. By switching the $\alpha_{max}$ and $\alpha_{min'}$ values, the limits would be moved in such a way that the switch is now at the right limit. A selection element may also be dynamically disabled or the number of selectable states may be changed dynamically. This could be reflected in a haptic feedback with hard stops.

Figure 4:
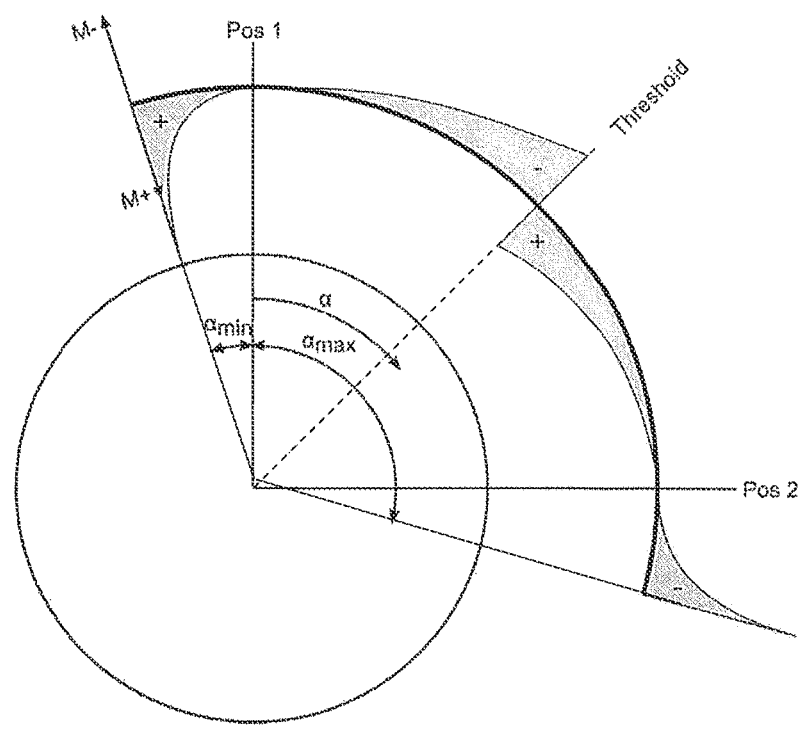
FIG. 4 is a graph showing dynamic step sizes and dynamic hard stops of the selection element.

In a second concept, as shown in FIG. 4, the mechanical locking is removed to enable dynamic distances of the thresholds. The mechanical locking works against and in the direction of orientation. Therefore, an electromagnetic brake cannot be used. Rather, an active actuator can replace the electromagnetic brake. FIG. 4 shows the torque in relation to a. As this curve can be dynamically adapted, the arrangement and the distance of different items can be changed with the appropriate haptic feedback. Furthermore, this actuator will retract the button to a distinct position if it is released near a threshold. This concept needs an actuator to apply torque to the rotary switch. Regarding the simple problem of indication mismatch between the actual status of the aircraft system and the status displayed by the selection unit 100, this actuator could be used to rotate a non-rotationally symmetric button to the appropriate position.

REFERENCE SIGN LIST 100 selection unit;
101-103 indication of different states or functions of an aircraft system;
104 rotatable part of a rotary switch;

105 non-rotatable part of a rotary switch including the first display;
106a, 106b possible states of the selection element;
107 actual state of the selection element;
108-112 elements/devices of the aircraft system;
113 second display; and
114 selection device for selecting the actual aircraft system, which is controlled by the selection unit.

The invention claimed is:

1. A selection unit to select a state from a plurality of different states of an aircraft system, the selection unit comprising:
a manually operable selection element, the selection element comprising a first display unit configured to present a selection indication of a selected state from a plurality of different states associated with the aircraft system based on a physical actuation of the selection element, wherein an actual state of the aircraft system depends on the selected state of the selection element, wherein the selection element is further configured for dynamic electronic selection of the selected state based on an external signal input; and
a second display unit co-located with the selection element so that the selection element is disposed within and surrounded by the second display unit, the second display unit configured to visualize subsystems of the aircraft system in the actual state of the aircraft system selected depending on the selected state of the selection element.

2. The selection unit of claim 1, further comprising an actuator to physically actuate the selection element into a selection position corresponding to the selected state of the selection element based on an external signal input.

3. The selection unit of claim 1, wherein the selection element is a rotary switch, a push button switch, a toggle switch, or a rocker switch.

4. The selection unit of claim 3, wherein the selection element is a rotary switch, the rotary switch configured to provide a push button function, wherein the selected state of the rotary switch is capable of being actuated only by a combination of manually turning the rotary switch and manually pushing the rotary switch.

5. The selection unit of claim 1, wherein the selection element is a rotary switch comprising a rotatable outer element surrounding an inner non-rotatable part that comprises the first display unit.

6. The selection unit of claim 1, wherein the selection element is a rotary switch comprising a rotatable part and a dynamically allocatable hard stop position for the rotatable part, the hard stop position based on an external signal input preventing further rotation of the rotatable part beyond the hard stop position.

7. The selection unit of claim 1, wherein the selection element is a rotary switch comprising a rotatable part and a dynamically allocatable mechanical threshold switch position, the threshold switch position based on an external signal input allowing further rotation of the rotatable part beyond the mechanical threshold switch position only when applying a force that overcomes the mechanical threshold switch position.

8. The selection unit of claim 7, wherein the selection element comprises an electromagnetic brake that maintains the mechanical threshold position.

9. The selection unit of claim 1, wherein an external signal input for the dynamic electronic selection of the selected state depends on the aircraft system or an actual system status of the aircraft system.

10. The selection unit of claim 9, comprising an input device to manually select the aircraft system from the plurality of aircraft systems.

11. The selection unit of claim 1, wherein the first display unit or the second display unit comprises one or more of the following list:
one or more LEDs;
one or more light conducting elements; and
a graphical monitor display.

12. An aircraft system comprising a plurality of subsystems, the aircraft system comprising:
a manually operable selection element, the selection element comprising a first display unit configured to present a selection indication of a selected state from a plurality of different states of the aircraft system based on a physical actuation of the selection element, wherein an actual state of the aircraft system depends on the selected state of the selection element, wherein the selection element is further configured for dynamic electronic selection of the selected state based on an external signal input; and
a second display unit co-located with the selection element so that the selection element is disposed within and surrounded by the second display unit, the second display unit configured to visualize subsystems of the aircraft system in the actual state of the aircraft system selected depending on the selected state of the selection element.

13. An aircraft comprising:
a plurality of aircraft systems, each of the aircraft systems comprising a plurality of subsystems;
a selector configured to select an aircraft system from the plurality of aircraft systems;
a manually operable selection element, the selection element comprising a first display unit configured to present a selection indication of a selected state from a plurality of different states of the aircraft system selected by the selector based on a physical actuation of the selection element, wherein an actual state of the aircraft system depends on the selected state of the selection element, wherein the selection element is further configured for dynamic electronic selection of the selected state based on an external signal input; and
a second display unit co-located with the selection element so that the selection element is disposed within and surrounded by the second display unit, the second display unit configured to visualize subsystems of the aircraft system in the actual state of the aircraft system selected depending on the selected state of the selection element.

14. The selection unit of claim 11, wherein the graphical monitor display is an LED display, an LCD display, a plasma display, an OELD display, or a Retina display.

15. The selection unit of claim 1, wherein in visualizing the subsystems of the aircraft system in the actual state of the aircraft system, the second display is configured to present the plurality of different states and a plurality of subsystems of the aircraft system, and further configured to schematically present connection indications of the selected state and a subset of the plurality of the subsystems associated with the selected state as interconnected by the section indication presented on the first display unit.

16. The aircraft system of claim 12, wherein in visualizing the subsystems of the aircraft system in the actual state of the aircraft system, the second display is configured to present the plurality of different states and the plurality of subsystems of the aircraft system, and further configured to schematically present connection indications of the selected state and a subset of the plurality of the subsystems associated with the selected state as interconnected by the section indication presented on the first display unit.

17. The aircraft system of claim 13, wherein in visualizing the subsystems of the aircraft system in the actual state of the aircraft system, the second display is configured to present the plurality of different states and the plurality of subsystems of the aircraft system, and further configured to schematically present connection indications of the selected state and a subset of the plurality of the subsystems associated with the selected state as interconnected by the section indication presented on the first display unit.

\* \* \* \* \*